Aug. 6, 1968  U. T. GAMBILL ET AL  3,396,070

AUTOMOBILE HEADLINER

Filed Feb. 28, 1964

INVENTORS
ULYSSES T. GAMBILL &
WILLIAM R. THOMAS
BY
ATTORNEYS

United States Patent Office 3,396,070
Patented Aug. 6, 1968

3,396,070
AUTOMOBILE HEADLINER
Ulysses T. Gambill, Newark, and William R. Thomas, Granville, Ohio, assignors to Owens-Corning Fiberglas Corporation, a corporation of Delaware
Filed Feb. 28, 1964, Ser. No. 348,028
5 Claims. (Cl. 161—119)

ABSTRACT OF THE DISCLOSURE

The wall panel (automobile headliner) has a main, porous body of molded fibrous material (glass) and a porous, flexible (foamed resin) facing sheet reproducing decorative surface configurations of the main body. The facing sheet is preferably adhered by a thin, imperforate resinous film to the main body, and the film seals colored binder within the main body and thereby prevents the binder from staining the facing sheet, and the film also transmits by vibration sound energy into the main body for attenuation thereby.

---

This invention relates generally to prefabricated, composite wall panels but more particularly to automobile headliners having bodies of molded fibrous glass and attached surfacing sheets, and to a method of producing such headliners. While this invention may be utilized to advantage in forming flat sectional panels, its benefits are more fully realized in connection with unitary headliners with curved edge portions and embossed surface patterns.

Automobile headliners should be capable of yielding under impact for reasons of safety, and should be pleasing in appearance to match the modern interior furnishings of presently produced vehicles. The resilience, durability, heat and sound insulation, and fire resistance of fibrous glass masses make them especially suitable as the body portions of these products.

A suitable surfacing sheet for a headliner should have the pliability to comply with the desired compressibility, and not only be attractive in color but also should follow concisely the contours of the configured surface of the molded body of the headliner.

The principal trouble encountered in the past in producing fibrous glass headliners with surfacing sheets has been in obtaining a thoroughly satisfactory appearance.

Because of the overall compound curves present in a unitary automobile headliner and the more detailed curvatures in the decorative configured surface thereof the surfacing sheet must be capable of easily and smoothly complying with non-planar surfaces. At the same time the sheet should not follow minor irregular undulations in the contour of the fibrous glass body nor in most cases reveal the fibrous texture thereof.

A troublesome factor in the manufacture of such headliners has been in securing adequate and uniform adhesion of the surfacing sheet to the main fibrous body portion.

If the surfacing sheet is subject to injury from too severe temperatures or is associated with a thermoplastic adhesive film, extreme care must be taken to prevent harm to the sheet or disintegration of the adhesive film when these elements are attached to the main body by and during the application of heat for curing the binder of the fibrous glass mass of which the headliner body is molded.

Other obstacles in the production of headliners have involved bleeding of the dark colored binder of the fibrous glass body into the surfacing sheet and extrusion of the thermoplastic adhesive film through the surfacing sheet.

Any procedure which overcomes these cited difficulties must also be economical and capable of volume output to be commercially feasible.

The principal object of this invention is to overcome these prior deficiencies and thus provide a highly satisfactory headliner, as well as a practical method of producing it.

A more specific object is to provide a method of adhering a surfacing sheet to the main body of a headliner without detracting from the final appearance thereof.

A further difficulty encountered in prior procedures has been in producing compound curvatures in an embossed decorative surface of a headliner. This has been due to the resistance of the fibrous glass body to exact shaping of its surface.

An important purpose of the invention is accordingly to provide a method for accurately shaping the surface contours in the main fibrous body and in neatly fitting and adapting the surfacing sheet to the configured surface. A better tailored and more precisely dimensioned headliner is thus created and one that complies with the high quality of the upholstery and other associated furnishings of the automobile interior.

Another objection to methods previously followed in making automobile headliners is that one or more of the components was degraded in appearance, function or structure through adverse temperatures or pressures required in a single shaping and compositing operation.

An additional failing of prior products has arisen from the reproduction in the surfacing sheet of minor irregularities in the general configuration of the headliner as well as in the more detailed contoured decorative surface.

These deficiencies in earlier products have been avoided in the practice of this invention, at least in part, by first and separately forming a fibrous glass body of the headliner, and by using a fairly thick surfacing sheet of a material easily stretched to follow the overall compound curvatures of the headliner and those of its more detailed contoured surface.

More specifically, the objects of this invention have been advanced through the use of a surfacing sheet of an open cell foamed resin.

Another means contributing to the attainment of the improvements sought by this invention comprises the use of two molds, the first of which shapes the fibrous glass body under the required high pressure and temperature and the second of which is for attaching the surfacing sheet to the body under more moderate compression and heat.

Another important aspect of the invention resides in arranging for extra space in the second mold to avoid extreme compaction of the extra thick surfacing sheet.

A further feature of the invention is the maintenance of the imperforate nature of the adhesive film which joins the surfacing sheet to the main body. The film may then serve to diaphragmatically transmit sound for attenuation in the fibrous body of the headliner.

The above as well as other features and advantages of the invention will be brought out hereafter in connection with the accompanying drawings in which.

Figure 1:
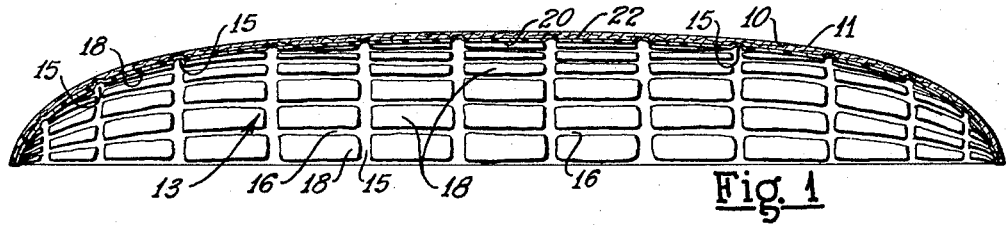
FIGURE 1 is a longitudinal vertical section of an automobile headliner embodying this invention.

Referring in more detail to the drawings the headliner of FIGURE 1 has a molded main body 10 of fibrous glass attached to the upper surface of which is a waxed paper sheet 11. The lower interior side of the headliner has a configured surface 13 which includes indented cross channels 15 and like longitudinal channels 16. Outlined by these channels are raised areas 18 generally rectangular in outline.

The configured surface 13 is shaped by the mold in which the body 10 is formed. Closely conforming with the curvatures of the surface is the formed resin sheet 20 which is attached by the polyethylene film 22.

Such a headliner is precisely dimensioned to fit neatly into and cover the complete inner side of the roof of an automobile body in which it is held by a peripheral trim channel over which it is snapped.

Figure 2:
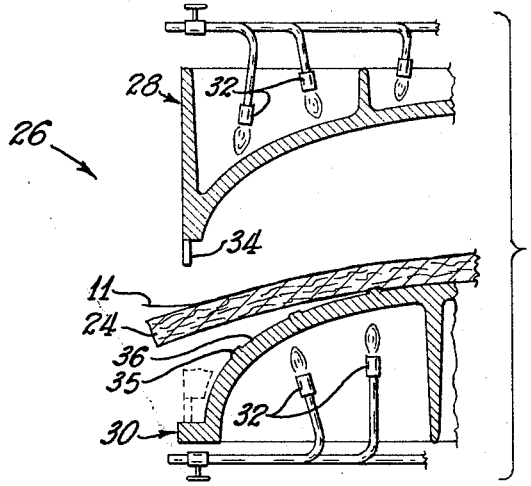
FIGURE 2 is a vertical section through an end portion of a mold in open position with a fibrous glass body blank in place for shaping by closing of the mold.

In following the practice of this invention as shown in FIGURE 2, a blank 24 cut from a fibrous glass pack containing an uncured binder is placed in a mold 26 having an upper half 28 and a lower base portion 30.

The fibrous glass pack from which such panels are constructed may be produced in a standard forming line, involving a furnace, from the forehearth of which molten glass is projected in fine streams through numerous ports in multiple bushings. High pressure steam or air discharged from associated manifolds attenuate the streams of glass into fine fibers. The latter fall in a random arrangement down within a forming hood and collect as a web or pack upon the foraminous surface of a traveling conveyor which passes across the bottom of the hood.

During the downward movement of the fibers, particles of a bonding agent are interspersed among the fibers by spray devices. The binder is preferably a phenol formaldehyde resin which may be extended about twelve percent by an addition of "Vinsol," a turpentine rosin derivative. The proportion of the binder should be between ten and twenty-six percent, and preferably about sixteen percent by weight of the final fibrous product.

The size of the glass fibers produced in such a production line may vary within a wide range and yet serve adequately as stock in the product of this invention. Should it be desired to utilize fibrous glass packs of particularly fine fibers, for example with diameters below twenty-five hundred thousandths of an inch, the production line would then conventionally incorporate either centrifugal or combustion gas type of fiber forming apparatus.

Glass fibers with diameters approximately thirty hundred thousandths of an inch in diameter have been found to be very satisfactory and are recommended for the practice of the invention.

Over the fibrous glass blank 24 positioned within the mold 26 is placed a waxed paper sheet 11 to act primarily as a mold releasing medium. Both parts of the mold are heated by gas flames from burners 32. To expeditiously cure the preferred phenol formaldehyde binder the mold parts are maintained at a temperature of approximately 500° F.

Instead of gas burners, electric resistor heating units may be mounted on the outer surfaces of the mold members. The position, size and number of these units may be selected to provide the desired temperature range and heat distribution.

On closing of the mold the fibrous blank which may be originally two inches in thickness with a density of one pound per cubic foot is compressed to generally a quarter inch thickness across the center portion and to one eighth of an inch around the border of the mold. A stop 34 projecting downwardly from the upper mold 28 controls the extent of compression of the fibrous pack. A curing time from forty-five to seventy-five seconds is all that is usually required to set the binder and thus establish the permanent shape of the headliner body.

The configured surface decoration desired on the interior of the headliner is complementarily engraved upon the lower half 30 of the mold 26. This may include a plain uniform pattern of raised areas outlined by two sets of parallel channels set at a right angle to each other like that illustrated in FIGURE 1 or a combination of ribs, grooves, generally flat and pebbled areas. To produce the configured desgin of FIGURE 1, the lower mold 30 has parallel ribs indicated at 35 bordering depressed portions 36.

Figure 3:
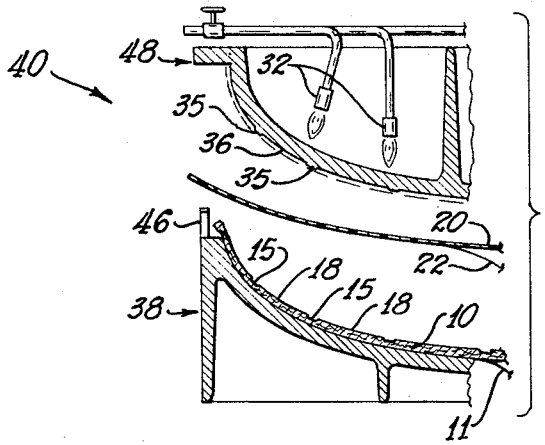
FIGURE 3 is a similar illustration of the end portion of a second mold in open position for shaping and joining the surfacing sheet to the previously formed main body of the headliner.

As shown in FIGURE 3 the main body 10 of the headliner as shaped in the mold of FIGURE 2 is inverted and placed with the configured surface decoration facing upwardly in the lower half 38 of reversed mold 40. The plastic adhesive film 22 and a sheet of foamed resin 20 are then inserted over the main body member 10.

The polyethylene film 22 and the foamed resin facing sheet 20 are preferably unattached but for easier handling, may be preliminarily joined together by staples or pressed together between rollers. The film is desirably between three and four mils in thickness. A film of three and half mil thickness, unpigmented and having a comparatively low specific gravity between 0.912 and 0.925 serves very satisfactorily.

A foamed polyurethane sheet between one sixteenth and one eighth of an inch in thickness is recommended. An open cell foam formation functions well in transmitting sound energy and also in allowing heat transfer to the underlying adhesive film 22 for attaching the sheet to the body.

As polyurethane foam is subject to deterioration under the effect of the ultra violet rays of sunlight, the surfacing sheet of this composition should be protected by a colored coating. "Hypalon," a chlorosulfonated polyethylene coating material produced by E. I. du Pont is very stable and effective for the purpose. The light shielding material may be applied by dipping. This insures a thorough impregnation. Over the base coat a design of contrasting color may be deposited from a roller. The coating is sufficiently light to preserve the desirably smooth, velvety feel of the polyurethane foam.

While the coating may increase the weight of the sheet of foamed polyurethane as much as eighty percent, in view of the extremely low specific gravity of the foam, the final weight of the coated product may be only eleven and six tenths grams per square foot in a thickness of three thirty-seconds of an inch.

The stretchable facing sheet may be composed of other foamed resins such as vinyl, or extensible fabrics or plain resinous sheets.

The vertically inclined marginal portion of the lower half 38 of mold 40 of FIGURE 3 is cut away about one sixteeth of an inch beyond the dimensions of the otherwise comparably shaped upper half 28 of the mold 26 shown in FIGURE 2. Likewise the stop member 46 on the lower mold half 38 is one sixteenth of an inch longer than the stop member 34 associated with the upper half 28 of mold 26. This is to allow space for a foamed facing sheet three thirty-seconds of an inch thick.

Only the upper member 48 of the mold 40 of FIGURE 3 is heated, utilizing gas burners 32. The temperature is held between 318° and 348° F. for fluidizing a polyethylene adhesive film underlying a polyurethane foam sheet. The upper mold member 48 is engraved with ribs 35 and depressed portions 36, like mold half 30, to force the facing sheet 20 in compliance with the configured surface of the fibrous body 10.

Through the action of the lengthened stop member 48 and the marginal widening of the lower mold half 38 the comparatively thick foamed resin sheet 20 is not destructively compressed by closing of the mold 40.

While the mold is closed, which may be limited to a period of twenty-four to ninety seconds, the heat from the upper mold part 48 passes down through the open cell structure of the foamed resin sheet 20 to fluidize the polyethylene film 22. The film, thus softened, engages fibers of the headliner body 10 and mechanically attaches itself to the cellular surface of the surface sheet 20. On opening of the mold and cooling of the polyethylene film the surfacing sheet 20 and the fibrous body 10 become thoroughly integrated.

By having the adhesive polyethylene film 22 in a thickness of three and one half mils, resistance to disintegration from the effect of the applied heat is improved and the possibility of break down of the film is minimized by restricting the molding and attaching period to the least time required for fluidizing the adhesive film.

Another characteristic desired in the film 22 is an extra smooth surface on the face contacting the fibrous glass body 10. This permits easy slippage between the two elements and facilitates the conforming movement thereof.

Without the presence of the film 22 the dark colored binder impregnant of the fibrous glass body may penetrate into and stain the foamed resin sheet. The polyethylene film also improves the washability of the headliner as it prevents a cleaning solution from entering the main body of the headliner. In the same maner the film provides resistance to moisture.

The wax paper 11 laid over the fibrous glass blank 24 and molded with it has several beneficial functions. It may first serve as a separator sheet between blank units when stacked for delivery to the mold from the fibrous mat production line. In the molding operation it prevents sticking of the binder impregnated fibrous glass blank to the upper mold 28 and is a quick release medium. As an integrated upper cover for the completed headliner, it retains loose fibers and presents a smooth surface, comfortable to the touch of installation personnel, and one that facilitates slipping the headliner in place to be snapped over the metal trim channels of the automobile body. The wax paper functions most satisfactorily and is economical in cost. Other materials which would serve quite as effectively include plastic films and cellophane.

In summary, the features of the invention include among others, the separation of the molding of the fibrous body and the molding attachment thereto of the surfacing sheet; the provision of a comparatively thick and stretchable surfacing sheet; the extra spacing in the second mold; a foamed resin surfacing sheet preferably of open cell structure; the use of different temperatures for the body molding and surfacing sheet attachment; and the maintenance of the imperforate nature of the adhesive film.

In regard to other materials involved, it should be acknowledged that various other fibrous glass bonding agents are well known and would be equally effective. Likewise, adhesive thermoplastic films other than polyethylene, such as polyvinyl chloride, polyvinyl acetate, and vinylidene chloride, could be easily adapted to the practice of this invention. Likewise, liquid and powdered adhesives are feasible but not considered as desirable. Also it is recognized that other mineral and organic fibers are comparable to glass fibers, though usually inferior in properties, and may be substituted therefor without too severe an effect upon the resulting products. Examples of such comparable fibers include those of rock wool, rayon, polyester and cellulose.

In order to present a particular example, the fibrous glass blank has been described as being two inches thick and having a density of one pound per cubic foot before being shaped and generally compressed to a cured thickness of one quarter of an inch.

The specifications of the fibrous blank will vary over a fairly wide range depending upon the size, shape and strength requirements of the headliner to be produced. Blank densities may run from one half a pound to as high as two pounds or more per cubic foot although one and half pounds is likely to be the top density limit. Instead of a single piece fibrous blank, for better uniformity or because of limited available stock, two or more thinner layers of fibrous material may be utilized for the molding blank. For instance, two one inch thick layers of fibrous glass with a density of one and thirty-five hundredths of a pound per cubic foot are presently being employed to form an automobile headliner.

Accordingly, it is desired that the accompanying claims be interpreted sufficiently broadly to encompass obvious alternate materials and natural modifications in the product and processing procedures herein described.

We claim:

1. An automobile headliner having a main body member of sound energy attenuating fibrous glass generally shaped to fit against the underside of an automobile roof, the interior surface of the main body member opposite to that adjacent to the automobile roof having a configured decorative pattern molded therein, an extensible and compressible open-cell foamed facing sheet having a thickness of three thirty-seconds of an inch disposed over the interior surface of the main body member and closely conforming with the configured pattern therein, and an imperforate polyethylene film attaching the facing sheet to the interior surface of the main body member, said film being vibratable to diaphragmatically transmit into the main body of fibrous glass sound energy entering through the foamed facing sheet.

2. An automobile headliner having a main body member of sound energy attenuating fibrous glass generally shaped to fit against the underside of an automobile roof, the interior surface of the main body member opposite to that adjacent to the automobile roof having a configured decorative pattern molded therein, an extensible and compressible open-cell foamed facing sheet having a thickness of three thirty-seconds of an inch disposed over the interior surface of the main body member and closely conforming with the configured pattern therein, and an imperforate resinous film attaching the facing sheet to the interior surface of the main body member, said film being vibratable to diaphragmatically transmit into the main body of fibrous glass sound energy entering through the foamed facing sheet, the resinous composition of the film being selected from the group consisting of polyethylene, polyvinyl chloride, polyvinyl acetate, and vinylidene chloride.

3. An automobile headliner having a main body member of sound energy attenuating fibrous glass generally shaped to fit against the underside of an automobile roof, the interior surface of the main body member opposite to that adjacent to the automobile roof having a configured decorative pattern molded therein, an extensible and compressible open-cell foamed facing sheet having a thickness of three thirty-seconds of an inch disposed over the interior surface of the main body member and closely conforming with the configured pattern therein, and an imperforate polyvinyl chloride film attaching the facing sheet to the interior surface of the main body member, said film being vibratable to diaphragmatically transmit into the main body of fibrous glass sound energy entering through the foamed facing sheet.

4. An automobile headliner having a main body member of sound energy attenuating fibrous glass generally shaped to fit against the underside of an automobile roof, the interior surface of the main body member opposite to that adjacent to the automobile roof having a configured decorative surface pattern molded therein, an extensible and compressible open-cell foamed facing sheet having a thickness of three thirty-seconds of an inch disposed over the interior surface of the main body member and closely conforming with the configured pattern therein, and an imperforate polyvinyl acetate film attaching the facing sheet to the interior surface of the main body member, said film being vibratable to diaphragmatically transmit into the main body of fibrous glass sound energy entering through the foamed facing sheet.

5. An automobile headliner having a main body member of sound energy attenuating fibrous glass generally shaped to fit against the underside of an automobile roof, the interior surface of the main body member opposite to that adjacent to the automobile roof having a configured decorative pattern molded therein, an extensible and compressible open-cell foamed facing sheet having a thickness of three thirty-seconds of an inch disposed over the interior surface of the main body member and closely conforming with the configured pattern therein, and an imperforate vinylidene chloride film attaching the facing sheet to the interior surface of the main body member, said film being vibratable to diaphragmatically transmit into the main body of fibrous glass sound energy entering through the foamed facing sheet.

References Cited

UNITED STATES PATENTS

| | | | |
|---|---|---|---|
| 2,948,650 | 8/1960 | Jackson et al. | 161 |
| 2,630,398 | 3/1958 | Brooks et al. | 161 |
| 2,794,756 | 6/1957 | Leverenz | 161 |
| 2,809,910 | 10/1957 | Deddo | 161—119 |
| 3,170,832 | 2/1965 | Wilson et al. | 161—119 |
| 3,186,895 | 6/1965 | MacDonald | 161—119 |
| 3,265,530 | 8/1966 | Marzocchi et al. | 161—203 |
| 2,466,966 | 4/1949 | Prance et al. | 156—244 |
| 2,526,311 | 10/1950 | Wilson | 161—159 |
| 2,991,212 | 7/1961 | Cotterman et al. | 156—214 |

MORRIS SUSSMAN, *Primary Examiner.*